United States Patent
Winkel

(10) Patent No.: US 8,321,098 B2
(45) Date of Patent: Nov. 27, 2012

(54) METHOD AND SYSTEM FOR CONTROLLING AND/OR REGULATING A MULTI-STEP AUTOMATIC GEARBOX OF A VEHICLE

(75) Inventor: Matthias Winkel, Weingarten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 556 days.

(21) Appl. No.: 12/532,894

(22) PCT Filed: Mar. 27, 2008

(86) PCT No.: PCT/EP2008/053634
§ 371 (c)(1),
(2), (4) Date: Sep. 24, 2009

(87) PCT Pub. No.: WO2008/122519
PCT Pub. Date: Oct. 16, 2008

(65) Prior Publication Data
US 2010/0087292 A1 Apr. 8, 2010

(30) Foreign Application Priority Data
Apr. 7, 2007 (DE) .......................... 10 2007 016 761

(51) Int. Cl.
*F16H 61/16* (2006.01)
(52) U.S. Cl. ......................................... 701/51; 477/125
(58) Field of Classification Search ..................... 701/51, 701/55, 56; 477/125
See application file for complete search history.

(56) References Cited

U.S. PATENT DOCUMENTS

| | | | |
|---|---|---|---|
| 5,272,939 A * | 12/1993 | Markyvech et al. | 477/120 |
| 5,479,345 A * | 12/1995 | Amsallen | 701/59 |
| 5,489,247 A * | 2/1996 | Markyvech et al. | 477/120 |
| 5,685,799 A * | 11/1997 | Vukovich et al. | 477/61 |
| 5,748,472 A * | 5/1998 | Gruhle et al. | 701/51 |
| 5,882,277 A | 3/1999 | Iizuka | |
| 6,157,886 A | 12/2000 | Janecke | |
| 6,285,941 B1 | 9/2001 | Janecke | |
| 7,076,355 B2 * | 7/2006 | Ota et al. | 701/51 |
| 7,695,404 B2 * | 4/2010 | Saitoh et al. | 477/92 |
| 7,972,244 B2 * | 7/2011 | Gierling et al. | 477/127 |
| 8,050,831 B2 * | 11/2011 | Martin et al. | 701/54 |
| 2008/0305927 A1 | 12/2008 | Gierling et al. | |

FOREIGN PATENT DOCUMENTS

| | | |
|---|---|---|
| DE | 197 40 648 A1 | 3/1998 |
| DE | 100 65 725 A1 | 7/2002 |
| DE | 10 2005 022 314 A1 | 11/2006 |
| EP | 0 270 194 A2 | 6/1988 |
| EP | 0 578 399 A2 | 1/1994 |
| EP | 0 638 742 A1 | 2/1995 |
| EP | 0 984 209 A1 | 3/2000 |

\* cited by examiner

*Primary Examiner* — Paul N Dickson
*Assistant Examiner* — Timothy Wilhelm
(74) *Attorney, Agent, or Firm* — Davis & Bujold, PLLC

(57) ABSTRACT

A method for controlling and/or regulating a multi-step automatic transmission of a vehicle in which an upshift is prevented if a power limit, of the motor of the vehicle, is reached such that, when a driving situation in which the power limit of the motor is reached and recognized, the motor speed (n) is set at a predetermined limit value ($n_{Limit}$). In addition, a system for implementing the method according to the invention is also proposed.

16 Claims, 2 Drawing Sheets

METHOD AND SYSTEM FOR CONTROLLING AND/OR REGULATING A MULTI-STEP AUTOMATIC GEARBOX OF A VEHICLE

This application is a National Stage completion of PCT/EP2008/053634 filed Mar. 27, 2008, which claims priority from German patent application serial no. 10 2007 016 761.1 filed Apr. 7, 2007.

FIELD OF THE INVENTION

The present invention concerns a method and a system for controlling and/or regulating an automatic transmission.

BACKGROUND OF THE INVENTION

From automotive technology it is known that with automatic transmissions having stepped transmission ratios a driving situation can arise, such that a maximum permitted motor speed is reached but too little power is available in the engaged gear. Owing to the lack of power the motor cannot generate the required traction force or the desired acceleration capacity needed for the next-higher gear step.

The driving situation described above is as a rule recognized by a driving strategy of an automatic transmission. As a result, in this driving situation an upshift is prevented. The frequency with which this driving situation occurs increases as transmission intervals per gear become larger, i.e. the driving situation occurs more frequently in transmissions with fewer gears, for example with six gears, than in transmissions with a larger number of gears, for example with 16 gears.

Due to the prevention of upshifts in such driving situations, the problem arises that the vehicle's motor is run for a longer time at the maximum motor speed. When the motor is running at full-load speed, its efficiency is lower. Consequently, the fuel consumption rises considerably. Moreover, the environment is affected adversely by larger quantities of exhaust gas emission and by greater noise production. In addition, driver acceptance is reduced since in the driving situation described, the driver is expecting an upshift.

For example, from DE 197 40 648 A1 a device for controlling gearshifts in an automatic transmission is known. In this device a means for preventing upshifts is provided, which only permits or carries out the upshift after a given time. When the current motor speed corresponds to the maximum motor speed, the upshift is prevented. However, as soon as the current speed tends to exceed the maximum speed, the upshift is initiated so that the motor speed will be reduced again. Thus, with the known device, exceeding the maximum motor speed is prevented because an upshift takes place.

Accordingly the problem outlined above, namely that of insufficient power in the next-higher gear, is not solved at all by the known device, since with the known device an upshift to the next-higher gear leaves the motor unable to provide the necessary traction force and the necessary acceleration capacity. Moreover, since with the known device operation at maximum motor speed is permitted, the fuel consumption also increases.

SUMMARY OF THE INVENTION

The purpose of the present invention is therefore to propose a method and a system of the type described at the start, with which, even when an upshift is prevented owing to insufficient power, a motor can be operated in as optimum a range in relation to its motor efficiency.

According to the claims, the objective of the invention is achieved by a method for controlling and/or regulating a multi-step automatic transmission of a vehicle, in which an upshift is prevented on the grounds that the power limit of the vehicle's motor has been reached, so that once a driving situation in which the power limit has been reached is recognized, the motor speed is restricted to a predetermined, consumption-friendly limit value.

By limiting the motor speed, as it were a more consumption-friendly full-load speed is set as the limit value upon recognition of the driving situation, so that not only is a reduction of the consumption obtained due to better motor efficiency at the established full-load speed, but also the driver's acceptance is increased. The driver acceptance is improved by the fact that owing to the limited motor speed, the driver is made aware of the power deficiency of the motor in the current gear, and will therefore not expect an upshift in this driving situation. Furthermore, by virtue of the method according to the invention the impact on the environment is reduced considerably because the quantity of exhaust emissions is smaller and the output of noise is lower.

In the context of a possible embodiment variant of the invention it can be provided that with the method according to the invention, the limit value is determined as a function of specified vehicle and/or vehicle status parameters. It has been found advantageous to determine the limit value, for example, as a function of the current transmission ratio step and/or the speed of the vehicle and/or the duration of the driving situation. Other vehicle or vehicle status parameters can also be taken into account for the determination of the limit value.

For example, if in a particular driving situation the motor has already exceeded the motor speed set as the limit value, the current speed can be maintained and thus determined as the limit value. It is also possible, however, for the speed to be reduced to the established limit value so as to keep to the limit value originally defined.

Preferably, the limit value is set below the maximum motor speed so as to ensure more economical operation of the vehicle's motor. As soon as the driving situation again permits an upshift, it can be provided in accordance with a further development of the invention that the limit value is cancelled and the motor speed is adjusted to a predetermined level, for example to the appropriate speed for shifting, so as thereby to enable the desired shift operation to be carried out. In this situation other motor speed strategies are also possible, in particular when certain driving programs are activated in the automatic transmission.

According to a related feature of the invention it can be provided that no motor speed limit value is set in the case of predetermined driving programs or driving conditions. For example, in the case of a manual shift operation or certain other selected driving programs of the automatic transmission, it is possible not to set a motor speed limit. Among these driving programs the so-termed kick-down operation can also be included.

However, when the kick-down driving program is active it is also possible for a motor speed limit value to be set when the power limit is reached. But in such a case the parameters for setting the limit value should be adapted appropriately and thus changed.

Independently of the driving situations outlined at the beginning, in which an upshift is prevented, the method according to the invention can also provide that the full-load speed is limited when the highest gear is reached and/or also when in the reversing gear. The nominal highest gear-step can also be reached, for example, if a particular driving program restricts the driving range to gears 1 to 3 in the automatic transmission. Then, reaching the third gear is tantamount to reaching the highest permitted gear.

The objective of the invention is also achieved by a system for controlling and/or regulating a multi-step automatic transmission of a vehicle, comprising a device for controlling shift processes which prevents an upshift when the power limit of the vehicle's motor has been reached. According to the invention, the system provides that on recognizing that the power limit has been reached, the device sets a predetermined limit value upon the motor speed. In this way the advantages already mentioned in the method context are obtained. Preferably, the device proposed according to the invention is used to implement the method described earlier. However, other fields of use are also conceivable.

BRIEF DESCRIPTION OF THE DRAWINGS

Below, the present invention is described in more detail with reference to the drawings, which show.

DETAILED DESCRIPTION OF THE PREFERRED EMBODIMENTS

Figure 1:
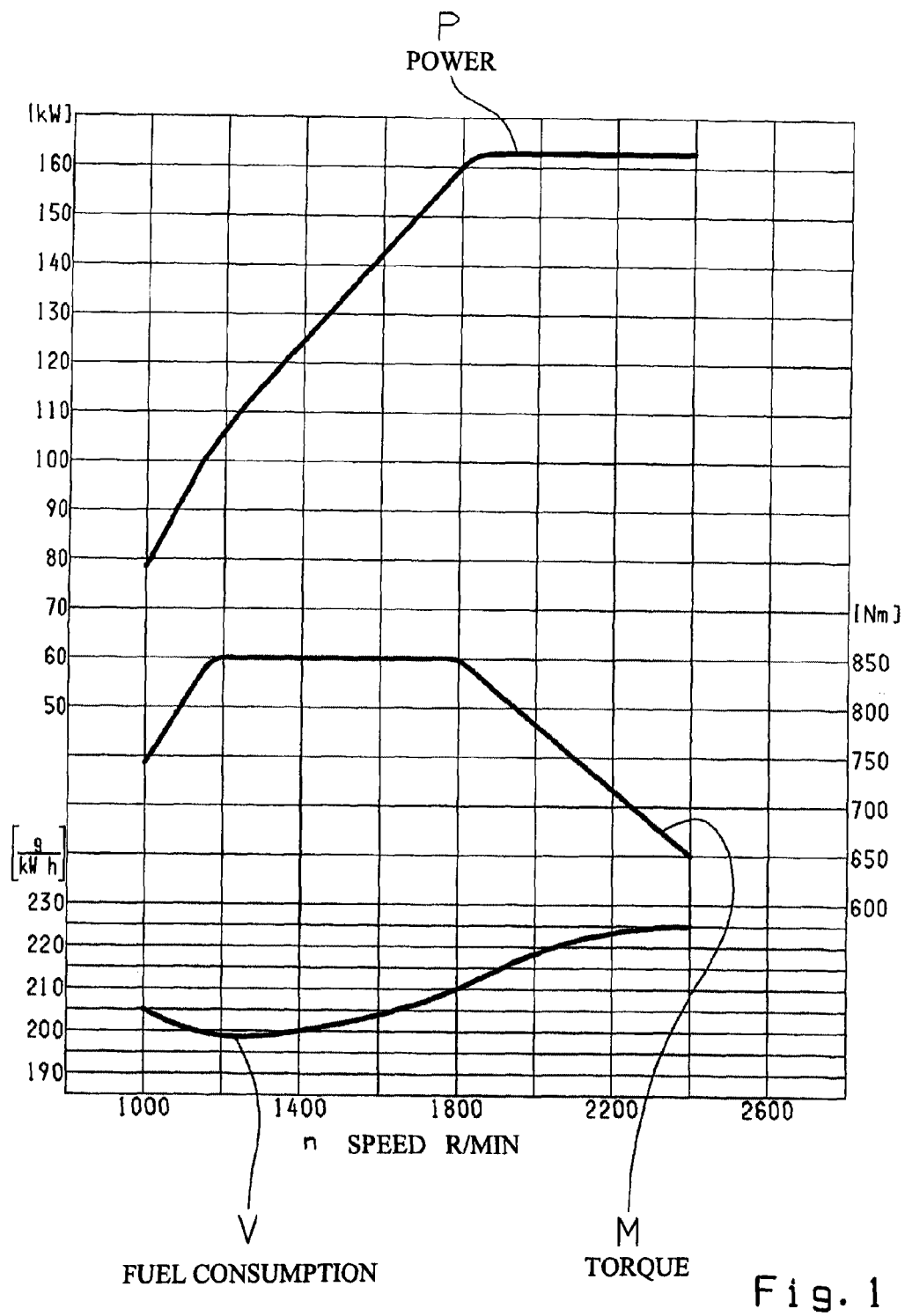
FIG. 1: Representation of an example motor performance diagram, in which power, torque and fuel consumption are shown as functions of the motor speed.

FIG. 1 shows, as an example, the power P, the torque M and the fuel consumption V plotted in a diagram as functions of the motor speed n.

Figure 2:
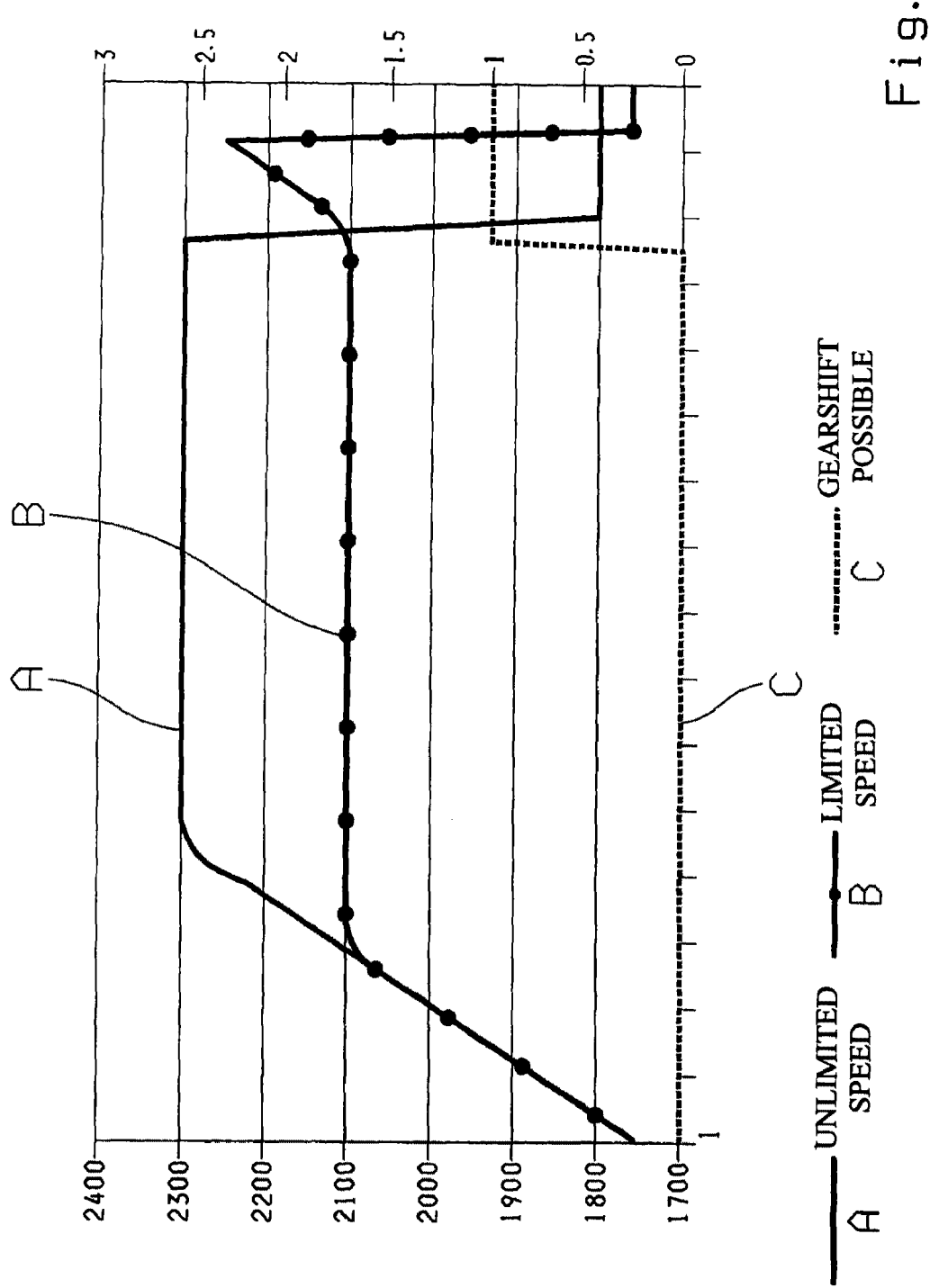
FIG. 2: Diagram showing examples of speed variations with and without limitation of the motor speed.

The diagram shown in FIG. 2 represents various motor speed variations. The motor speed variation indexed A occurs if the motor speed n is not limited when an upshift is prevented. The variation A, in which the full-load speed of the motor is not reduced, is shown as a continuous line. Index B denotes another speed variation, in which a limit value $n_{Limit}$ is set for the motor speed n. Variation B is shown as a line with points on it. Finally, a variation C represented as a broken line is shown in FIG. 2, this line indicating when a shift is possible.

Speed variation A shows that because of the banner upshift, the motor speed n increases steeply until the maximum or full-load speed $n_{max}$ of 2300 revolutions per minute has been reached. As soon as an upshift to the next-higher gear step becomes possible again, which is indicated as a rise of variation C to the value 1, the motor speed n falls suddenly and steeply until it finally reaches the value 1800 revolutions per minute. Variation A shows that the motor speed n remains at 2300 revolutions per minute for quite a long time. At this speed the fuel consumption is about 225 g/kw h.

Applying the method according to the invention, when an upshift to the next-higher gear step is not possible because of insufficient power, the motor speed n is set at a predetermined limit value $n_{Limit}$. This speed management in accordance with the proposed method is represented by the speed variation B, shown as a line with points along it. In the case of variation B there is at first a speed increase similar to that of variation A. However, when the set limit value $n_{Limit}$ of the motor speed, which in the example shown is established at 2100 revolutions per minute, has been reached, the speed remains constant. Only when an upshift is permitted again and the limit value $n_{Limit}$ is cancelled, can the motor speed n be increased for a short time to a predetermined shift speed in order to carry out the shift operation. In the next-higher gear the speed falls to approximately 1750 revolutions per minute. At the limit value $n_{Limit}$ of 2100 revolutions per minute the fuel consumption is approximately 220 g/kw h.

A comparison of the two variations A and B makes it clear that by using limit value $n_{Limit}$ for the full-load speed as in the method according to the invention, the speed is kept lower for a longer time. Consequently, when the method and system according to the invention are used, fuel consumption is reduced by approximately 2.5%.

Indexes
A Speed variation with no imposed limit
B Speed variation with an impose limit
C Shift
P Power
M Torque
V Fuel consumption
n Motor speed
$n_{Limit}$ Limit value
$n_{max}$ Maximum motor speed

The invention claimed is:

1. A method of controlling a multi-step automatic transmission of a vehicle in which an up-shift is prevented if a power limit of the vehicle motor is reached, the method comprising the steps of:
   detecting the power limit of the vehicle motor during operation of the vehicle;
   recognizing a driving situation in which the power limit of a motor is reached, and
   setting a motor speed (n) to a predetermined limit value ($n_{Limit}$) so as to temporarily prevent an up-shift of a transmission due to sufficient motor power.

2. The method according to claim 1, further comprising the step of determining the limit value ($n_{Limit}$) as a function of at least one of vehicle parameters and vehicle status parameters.

3. The method according to claim 2, further comprising the step of determining the limit value ($n_{Limit}$) as a function of at least one of:
   a current transmission ratio step,
   a speed of the vehicle,
   a driving situation,
   a driver's wish,
   a status of the motor, and
   a duration of a driving situation.

4. The method according to claim 1, further comprising the step of setting the limit value ($n_{Limit}$) lower than a maximum motor speed ($n_{max}$).

5. The method according to claim 1, further comprising the step of adjusting the motor speed to a shift speed of a gear step to be engaged, once the limit value ($n_{Limit}$) is cancelled, to carry out a shift operation.

6. The method according to claim 1, further comprising the step of avoiding, in certain predetermined driving programs of the automatic transmission, imposition of a limit value ($n_{Limit}$) upon the motor speed (n).

7. The method according to claim 1, further comprising the step of changing parameters for the limit value ($n_{Limit}$) in a kick-down driving program.

8. The method according to claim 1, further comprising the step of setting the limit value ($n_{Limit}$) when at least one of a highest gear step and a reversing gear is reached.

9. A system for controlling a multi-step automatic transmission of a vehicle, the system comprising:
   a device for controlling shift operations and preventing an up-shift in the event a power limit of the vehicle motor is reached,
   the device recognizing when the power limit is reached,
   the device setting the motor speed (n) to a predetermined limit value ($n_{Limit}$) and temporarily preventing an upshift of a transmission until an upshift of the transmission, to a next higher gear step, becomes possible due to sufficient motor power; and cancelling the limit value ($n_{Limit}$) of the motor and permitting the motor speed to exceed the limit value ($n_{Limit}$) and perform the upshift of the transmission to the next higher gear step.

10. The method according to claim 9, further comprising the step of avoiding, in certain predetermined driving programs of the automatic transmission, imposition of a limit value ($n_{Limit}$) upon the motor speed (n).

11. The method according to claim 9, further comprising the step of changing parameters for the limit value ($n_{Limit}$) in a kick-down driving program.

12. The method according to claim 9, further comprising the step of setting the limit value ($n_{Limit}$) when at least one of a highest gear step and a reversing gear is reached.

13. A method of controlling a multi-step automatic transmission of a vehicle for improving fuel consumption, the method comprising the steps of:

setting a motor speed, for a motor of the vehicle, to a limit value ($n_{Limit}$) which is lower than a maximum motor speed ($n_{max}$) for the motor;

upon reaching the limit value ($n_{Limit}$) of the motor, temporarily preventing the motor speed of the motor from exceeding the limit value ($n_{Limit}$) and prevention an upshift of a transmission until an upshift of the transmission, to a next higher gear step, becomes possible due to sufficient motor power;

recognizing when the upshift of the transmission to the next higher gear step is possible due to sufficient motor power;

cancelling the limit value ($n_{Limit}$) of the motor; and allowing the motor speed to exceed the limit value ($n_{Limit}$) and perform the upshift of the transmission to the next higher gear step.

14. The method according to claim 13, further comprising the step of avoiding, in certain predetermined driving programs of the automatic transmission, imposition of a limit value ($n_{Limit}$) upon the motor speed (n).

15. The method according to claim 13, further comprising the step of changing parameters for the limit value ($n_{Limit}$) in a kick-down driving program.

16. The method according to claim 13, further comprising the step of setting the limit value ($n_{Limit}$) when at least one of a highest gear step and a reversing gear is reached.

* * * * *